United States Patent [19]
Ichiyoshi

[11] Patent Number: 5,867,792
[45] Date of Patent: Feb. 2, 1999

[54] RADIO COMMUNICATION SYSTEM

[75] Inventor: Osamu Ichiyoshi, Tokyo, Japan

[73] Assignee: NEC Corporation, Tokyo, Japan

[21] Appl. No.: 971,506

[22] Filed: Nov. 17, 1997

Related U.S. Application Data

[63] Continuation of Ser. No. 427,598, Apr. 24, 1995, abandoned.

[30] Foreign Application Priority Data

Apr. 22, 1994 [JP] Japan .................................. 6-107702

[51] Int. Cl.⁶ .............................. H04B 1/00; H04B 7/00
[52] U.S. Cl. .......................................... 455/526; 455/517
[58] Field of Search ............................... 455/24, 78, 517, 455/526, 524

[56] References Cited

U.S. PATENT DOCUMENTS

| | | | |
|---|---|---|---|
| 4,383,331 | 5/1983 | Davidson | 455/24 |
| 4,475,246 | 10/1984 | Batlivala et al. | 455/24 |
| 4,789,993 | 12/1988 | Ryu | 455/24 |
| 5,425,076 | 6/1995 | Knippelmier | 379/58 |
| 5,444,864 | 8/1995 | Smith | 455/24 |

FOREIGN PATENT DOCUMENTS 63-79429   4/1988   Japan .

*Primary Examiner*—Reinhard J. Eisenzopf
*Assistant Examiner*—Marsha D. Banks-Harold
*Attorney, Agent, or Firm*—Ostrolenk, Faber, Gerb & Soffen, LLP

[57] ABSTRACT

A radio communication system comprises a plurality of personal terminals and a base station, the personal terminal being equipped with a non-directional antenna or a directional antenna directed to the base station, which transmits and receives a signal at an identical frequency, the base station, which establishes a communication path between the personal terminals by relaying of the signals, comprising a non-directional transmitting antenna and a receiving antenna located in such a positional relationship as to minimize the amounts of the signals coupled at the respective antennas, and feeds the received signal received by the receiving antenna to the transmitting antenna while cancelling a leakage signal from the transmitting antenna which is contained in the received signal, by using a reference signal set on a given frequency channel which may be modulated with a broadcast signal.

9 Claims, 5 Drawing Sheets

GT: GAIN OF TRANSMITTING AMP 4.

GR: GAIN OF RECEIVING AMP. 6.

GM: SUM GAIN OF AMPs. 21, 23 AND 27

RADIO COMMUNICATION SYSTEM

This is a continuation of application Ser. No. 08/427,598, filed on Apr. 24, 1995, now abandoned.

BACKGROUND OF THE INVENTION

1. Field of the Invention

The present invention relates to a radio communication system which comprises a base station and a plurality of personal radio apparatuses (terminal stations).

2. Description of the Prior Art

Radio communications are suitable for establishing communication networks without communication lines and for establishing communication with mobile units, and known examples of a radio communication system include personal communication systems which allow simple and easy establishment of communication networks in areas without telephone networks which imitate telephone networks.

As shown in, for example, FIG. 4, personal radio systems consist only of terminal stations (personal radio apparatuses) 1, with no base station, and are purpose-built systems for distributed processing, wherein each terminal station has a non-directional antenna 1a and is operative separately; a characteristic aspect thereof is in that any subscriber may enter the radio communication network upon purchase of personal radio equipment, and thus the system is extremely simple and easy to construct and operate. As many as 1,500,000 personal radio apparatuses are presently used in Japan.

Personal radio systems are MCA (Multi Carrier Access) radio systems which allow joint use by the subscribers of eighty radio frequency channels confined within a 900 MHz band, wherein searching for unallocated channels and setting of channels are conducted with a controlling channel at each terminal station, and communication is performed between the subscribers with matching identification numbers in a press-to-talk method on an identical radio carrier frequency.

Two thirds of the population in the world live without telephone, and a variety of social problems are caused because of this lack of communication means. The aforementioned personal radio system is the best way of establishing simple and easy communication networks in such areas without telephones. Existing personal radio systems, however, are established for the purpose of communication within extremely confined areas, and this presents a problem in that the systems cannot be directly used for networks extended over relatively wide areas.

More specifically, the existing personal radio systems have no base station, and horizontal non-directional antennas are used at the respective terminal stations. Accordingly, the distance which a carrier signal may travel is restricted due to a low antenna gain. For example, in FIG. 4, the terminal station A may communicate with B and C, but fails to communicate with the terminal station E at a considerable distance therefrom.

For this reason, in order to allow establishment of a communication network over a relatively broad area, it becomes necessary to settle a base station as the core of the target area and to perform amplifying relay. However, as mentioned above, since an identical frequency is employed for both transmitting and receiving, usual ways for amplifying relay cannot be adopted. As a system for amplification at a relay station in such cases, there has hitherto been known, for example, the amplifying relay system shown in FIG. 5, which is a candidate system for communication over a wide area.

The amplifying relay system shown in FIG. 5 is disclosed in Japanese Laid-Open Patent Application SHO No. 63-79429 (published Apr. 9, 1988), which comprises a receiving antenna 41, a directional coupler 42, a detection circuit 43, a variable attenuator 44, a frequency converter 45, an oscillator 46, an amplifier 47, a control circuit 48 and a transmitting antenna 49. This amplifying relay system is designed so as to shift the frequency of the received signal slightly to generate the frequency of the transmitted signal at the frequency converter 45, to detect the coefficient of coupling due to a sneak signal from the transmitting antenna 49 to the receiving antenna 41 and to control the magnitude of attenuation by the variable attenuator 44 through the control circuit 48 in order to maintain stability of the loop.

With this conventional amplifying relay system which involves frequency conversion to distinguish between the received signal and the transmitted signal, however, since a rather large difference must exist between the frequencies in order to ensure reliable operation of the detection circuit 43, the system has the problem of difficult reception by personal radio equipment (a terminal station) which utilizes an identical frequency for transmitting and receiving signals.

SUMMARY OF THE INVENTION

It is an object of the present invention to provide a radio communication system capable of establishing cost-effective communication networks over wide areas, while using terminal stations (personal radio equipment), which uses a common identical carrier frequency.

In order to accomplish the aforementioned object, the radio communication system of the present invention is constructed as follows.

That is, a radio communication system of the present invention comprising a plurality of terminal stations which transmit and receive signals at an identical frequency; and a single base station for establishing communication paths between the terminal stations by operation for amplifying and relaying of signals, is characterized in that each terminal station comprises a non-directional antenna or a directional antenna directed to the base station; and the base station comprises a non-directional transmitting antenna and a receiving antenna located in such a positional relationship as to minimize the amount of the signals coupled to the respective antennas; and means for amplifying and feeding the received signal of the receiving antenna to the transmitting antenna while cancelling leakage from the transmitting antenna which is contained in the received signal of the receiving antenna, using a reference signal set on a given frequency channel.

More concretely, the radio communication system of the present invention comprising a plurality of terminal stations which transmit and receive signals at an identical frequency; and a single base station for establishing communication paths between the terminal stations by operation for amplifying and relaying of signals, is characterized in that each terminal station comprises a non-directional antenna or a directional antenna directed to the base station; and the base station comprises:

a non-directional transmitting antenna and a receiving antenna located in such a positional relationship as to minimize the amount of a signal coupled to the respective antennas;

a circuit for generating the frequency signal of a given frequency channel as the reference signal, or the frequency signal of a given frequency signal which has been modulated by a broadcast signal as the reference signal;

an interference-wave cancellation circuit which receives the received signal of the receiving antenna, the aforementioned reference signal and a part of a transmitted signal from the transmitting system as inputs thereto, and outputs the received signal after the leakage from the transmitting antenna has been cancelled;

a buffer which receives the output of the interference-wave cancellation circuit;

a signal combiner for combining the output of the aforementioned buffer and the aforementioned reference signal;

a signal distributor which furcates the output of the signal combiner and outputs either one of the two difurcated signals as the aforementioned partial transmitted signal; and a transmission amplifier which subjects the other difurcated signal from the signal distributor to power amplification and outputs the amplified signal to the transmitting antenna.

According to an additional embodiment, the radio communication system of the present invention further comprises;

a switch board to be connected to an exterior public telephone network;

a telephone signal modulator which modulates the frequency signal of a given frequency channel with a telephone signal from the public telephone network which is outputted from the aforementioned switchboard, the output of the aforementioned telephone signal modulator being supplied to the signal combiner; and a telephone signal demodulator which demodulates the furcated signal from the signal distributor and outputs the demodulated signal as a telephones signal.

Here, the "broadcast signal" includes local-area broadcast information which may be collected in the base-station installed area, wide-area broadcast information in the case where a wide-area broadcast receiver is provided which receives exterior wide-area broadcast information from a satellite, and combinations of the local-area broadcast information and the wide-area broadcast information.

Furthermore, the interference-wave cancellation circuit includes a canceller for cancelling the leakage signal from the transmitting antenna which is contained in the received signal of the receiving antenna, by an interference-wave cancellation signal; a circuit for controlling the amplitude and phase of the partial transmitted signal on the basis of a control signal so as to output the aforementioned interference-wave cancellation signal; a branching circuit for furcating the output of the canceller and outputting either one of the two furcated signals to the buffer; a correlation detector for detecting a correlation between the output of the other furcated signal from the branching circuit and the aforementioned reference signal; and a circuit for generating the aforementioned control signal on the basis of the output of the correlation detector.

Here, the terminal stations are personal radio equipment.

BRIEF DESCRIPTION OF THE DRAWINGS

Other objects, features and advantages of the present invention will become more apparent when the following description is read in conjunction with the accompanying drawings, wherein.

DESCRIPTION OF THE PREFERRED EMBODIMENTS

Embodiments of the present invention will now be explained with reference to the accompanying drawings.

Figure 1:
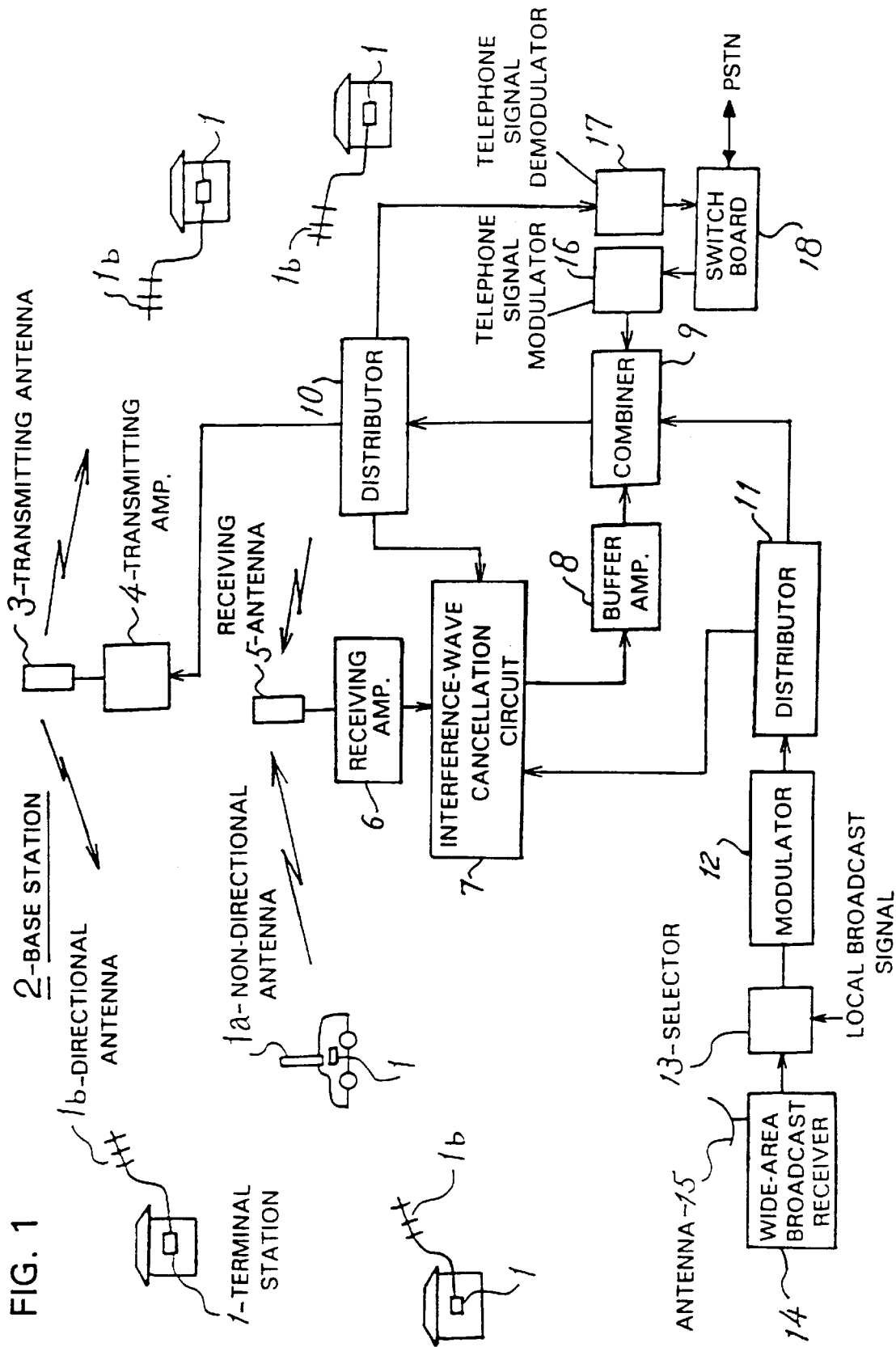
FIG. 1 is a block diagram which shows the entire construction of the radio communication system according to an embodiment of the present invention.

Referring to FIGS. 1 showing a first embodiment of the present invention, a radio communication system comprises a plurality of terminal stations 1 and a single base station 2 which establishes communication paths between the terminal stations through its operation for amplifying and relaying of signals. Each terminal station 1 performs conventional personal radio apparatuses and, thus, transmits and receives signals on an identical carrier frequency in the same manner as the prior art, but is equipped with a directional antenna 1b directed to the base station 2 when installed indoors. When installed in a mobile unit, though equipped with a non-directional antenna in the illustrated embodiment in the same manner as the prior art, each terminal station 1 may be equipped with a directional antenna in cases where it is provided with a tracking device. Even a mobile unit with no tracking device provided may be equipped with a directional antenna which may be manually directed to the base station 2.

The base station 2 is usually installed in the center of the area in order to establish the communication paths between the terminal stations. The base station 2 according to the present embodiment comprises a transmitting antenna 3, a transmitting amplifier 4, a receiving antenna 5, a receiving amplifier 6, an interference-wave cancellation circuit 7, a buffer amplifier 8, a signal combiner 9, signal distributors 10 and 11, a broadcast signal modulator 12, a signal selector 13, a wide-area broadcast information receiver 14, a wide-area broadcast information receiving antenna 15, a telephone signal modulator 16, a telephone signal demodulator 17, a switch board 18.

The transmitting antenna 3 and receiving antenna 5 are both non-directional antennas, and these antennas are located in such a positional relationship as to minimize the amounts of the signals coupled at the respective antennas. For example, since a rod antenna, which is a half-wave antenna, achieves a horizontal, non-directional gain but vertically has a so-called zero point which reflects no gain, vertical displacement of such antennas allows both the co-located transmitting antenna 3 and the receiving antenna 5 to have a given sensitivity with the least possible amounts of the signals coupled at the respective antennas. Helical antennas may also be used.

A received telecast, radio broadcast, or other so-called nationwide broadcast signal received by the antenna 15 and the receiver 14 is inputted to the signal selector 13. The signal selector 13 selects the wide-area broadcast signal given or a local-area broadcast signal.

The broadcast signal modulator 12 modulates the frequency signal of a given frequency channel with the selected broadcast signal from the signal selector 13 to produce a reference signal. This reference signal is fed to the interference-wave cancellation circuit 7 and signal combiner 9 via the signal distributor 11.

Here, the reference signal may be either of the two, and may also be the frequency signal itself of the given frequency channel. When the frequency signal is used, the signal modulator 12 operates as a mere oscillator.

The received signal from the receiving antenna 5 is amplified through the receiving amplifier 6 and inputted to the interference-wave cancellation circuit 7. The signal combiner 9 combines the output of the interference-wave cancellation circuit 7 which is inputted via the buffer amplifier 8, the reference signal and the output of the telephone signal modulator 16. The signal distributor 10 furcates the output of the signal combiner 9; a first furcated signal is fed to interference-wave cancellation circuit 7 as a part of a transmission signal, a second furcated signal is fed to the telephone signal demodulator 17, and a third furcated signal is fed to the transmitting antenna 3 via the transmitting amplifier 4, as the transmission signal.

The switch board 18 feeds the telephone signal from a PSTN (public telephone network) to the telephone signal modulator 16 for modulation with the frequency signal of a given frequency channel, and sends the telephone signal demodulated through the telephone signal demodulator 17 to the PSTN.

As mentioned above, the loop: interference-wave cancellation circuit 7→buffer amplifier 8→signal combiner 9→signal distributor 10→interference-wave cancellation circuit 7 cancels a sneak (leakage) signal from the transmitting antenna 3 which is contained the received signal from the receiving antenna 5, and the sneak signal-cancelled received signal undergoes power amplification through the transmitting amplifier 4 and then sent via the transmitting antenna 3.

Figure 2:
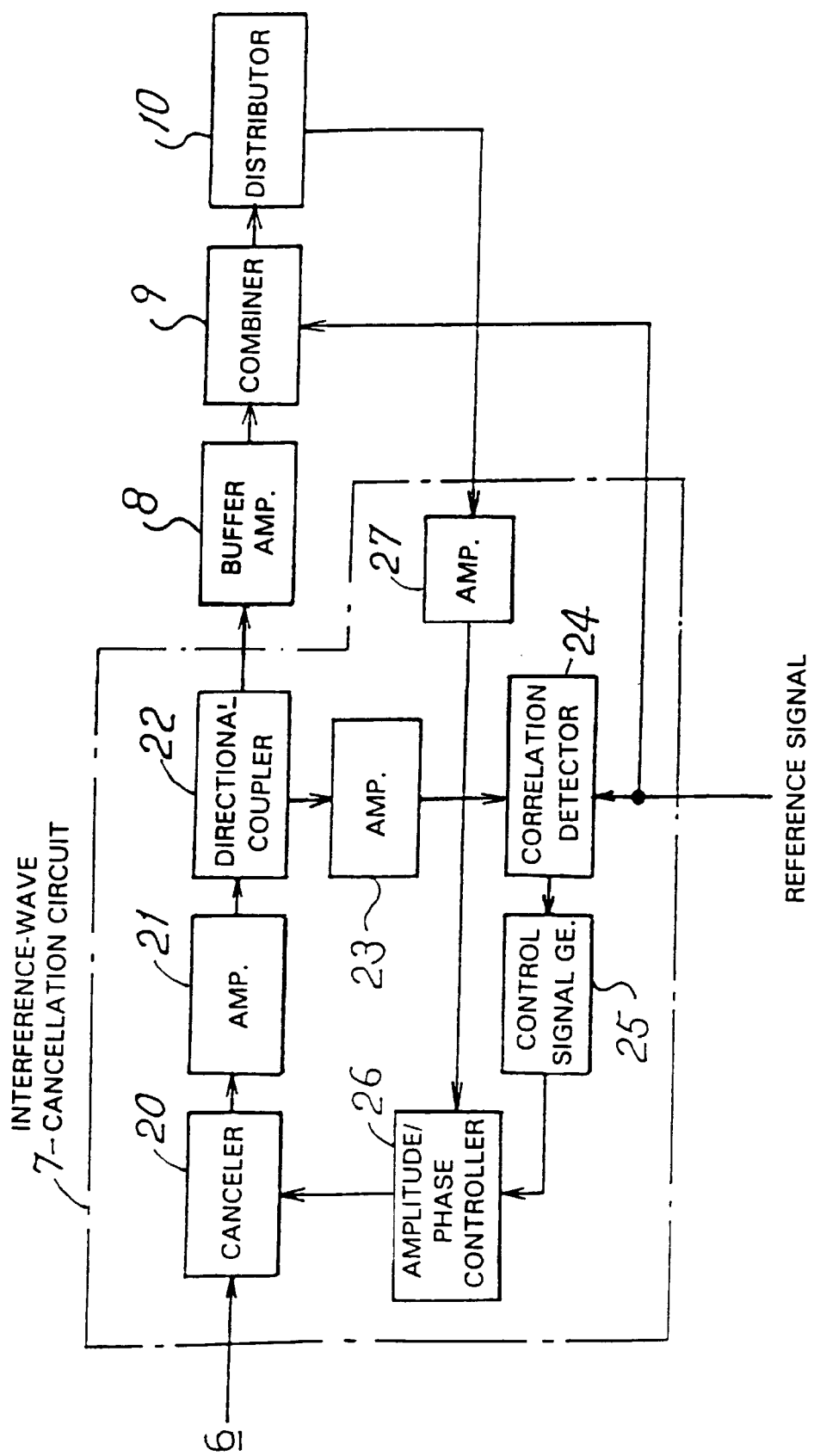
FIG. 2 is a block diagram which shows the fundamental construction of the interference-wave cancellation circuit and interference-wave cancellation system according to the present invention.

The interference-wave cancellation circuit of the present invention may be concretely constructed as shown in FIG. 2. In FIG. 2, the interference-wave cancellation circuit 7 basically comprises a canceller 20, an amplifier 21, a directional coupler 22, an amplifier 23, a correlation detector 24, a control signal generator 25, an amplitude/phase controller 26 and an amplifier 27.

The operation of the interference-wave cancellation circuit 7 will now be explained. The canceller 20 cancels the leakage signal from the transmitting antenna which is contained in the received signal of the receiving antenna, with the interference-wave cancellation signal which is outputted from the amplitude/phase controller 26. The output from the canceller 20 is fed to the buffer amplifier 8 via the amplifier 21 and directional coupler 22, and the signal extracted through the directional coupler 22 is inputted to the correlation detector 24 as the other input via the amplifier 23.

The correlation detector 24 detects a correlation between the signal extracted through the directional coupler 22 and the aforementioned reference signal. The control signal generator 25 produces a control signal which is required to cancel the interference-wave on the basis of the output of the correlation detector 24. The amplitude/phase controller 26 controls the amplitude and phase of the furcated output (the partial transmission signal) from the signal distributor 10 on the basis of the output from the control signal generator 25, and outputs the aforementioned interference-wave cancellation signal.

Figure 3A:
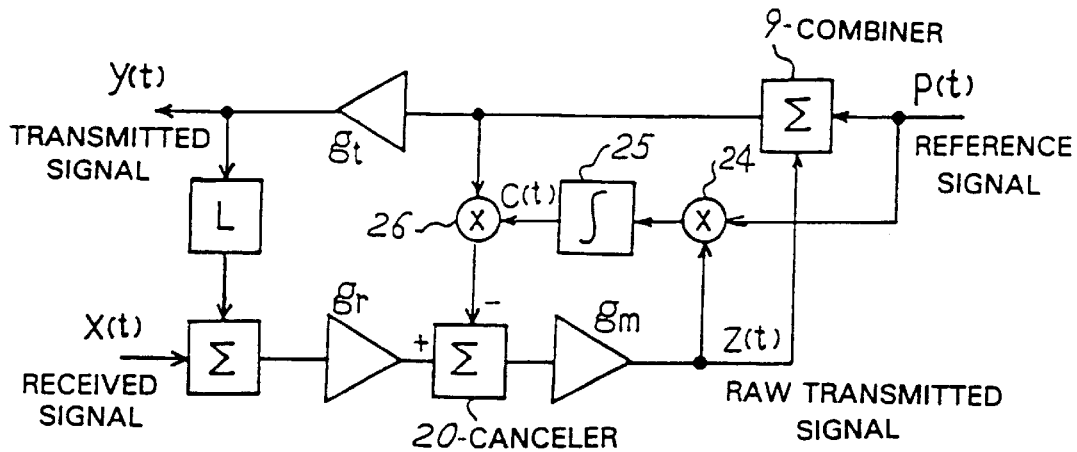
FIG. 3(a) is an illustration of a transfer characteristics of a base station in the interference-wave cancellation operation according to the present invention.

A concrete explanation will now be given regarding the operation of the interference-wave cancellation system of the present invention with reference to FIG. 3(a). The view shown in FIG. 2 is that of the fundamental construction of the interference-wave cancellation system of the present invention, and the transfer characteristics of the entire base station which cancels the interference-wave are shown in FIG. 3(a). In FIG. 3(a), x(t) is the received signal, L is coupling coefficients of the transmitting antenna 3 and receiving antenna 5, c(t) is a control signal, $g_t$ is the gain of the transmitting amplifier 4, $g_r$ is the gain of the receiving amplifier 6, and $g_m$ is the gain of all the amplifiers (21, 23, 27) in the interference-wave cancellation circuit 7.

Figure 3B:
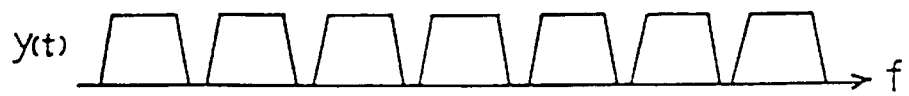
FIG. 3(b) shows the frequency spectra of a transmitted signal y(t) in FIG. 3(a)
Figure 3C:
FIG. 3(c) shows the frequency spectra of a raw transmitted signal z(t) which is generated in a control loop for interference-wave cancellation in FIG. 3(a)
Figure 3D:
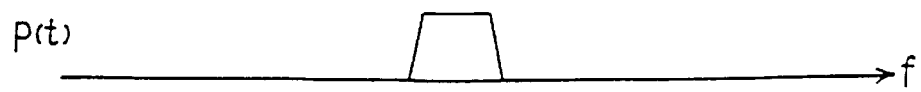
FIG. 3(d) shows the frequency spectra of a reference signal p(t) in FIG. 3(a)

Since the communication between the respective terminal stations is performed according to the FDM system, the frequency spectra of the transmitted signal y(t) is as shown in FIG. 3(b), while the spectra of a raw transmitted signal z(t) which is generated in the control loop is as shown in FIG. 3(c) because the control loop for cancellation of the interference wave operates to suppress the reference signal p(t), and the reference signal p(t) is generated at the position of a given frequency channel and multiplexed, as shown in FIG. 3(d).

Measurement of the transfer properties of the respective signals with reference to FIG. 3(a) establishes Equation 1 for the transfer properties of the transmitted signal y(t) and Equation 2 for the transfer characteristics of the raw transmitted signal z(t).

$$y(t)=g_t\{z(t)+p(t)\} \quad \text{Equation 1}$$

$$z(t)=g_m[g_r\{L\cdot y(t)+x(t)\}-c(t)\cdot\{p(t)+z(t)\}] \quad \text{Equation 2}$$

Accordingly, since the control signal c(t) changes very slowly with time in a steady state and thus may be regarded to be a constant, representing the constant by c alone, Equations 1 and Equation are used to derive Equation 3 for the transfer characteristics of the transmitted signal y(t) and Equation 4 for the transfer characteristics of the raw transmitted signal z(t).

$$y(t)=\{g_0 x(t)+g_t p(t)\}\div(1+cg_m-g_0 L) \quad \text{Equation 3}$$

$$z(t)=\{(g_0/g_t)x(t)+(g_0 L-cg_m)p(t)\}\div(1+cg_m-g_0 L) \quad \text{Equation 4}$$

Figure 4:
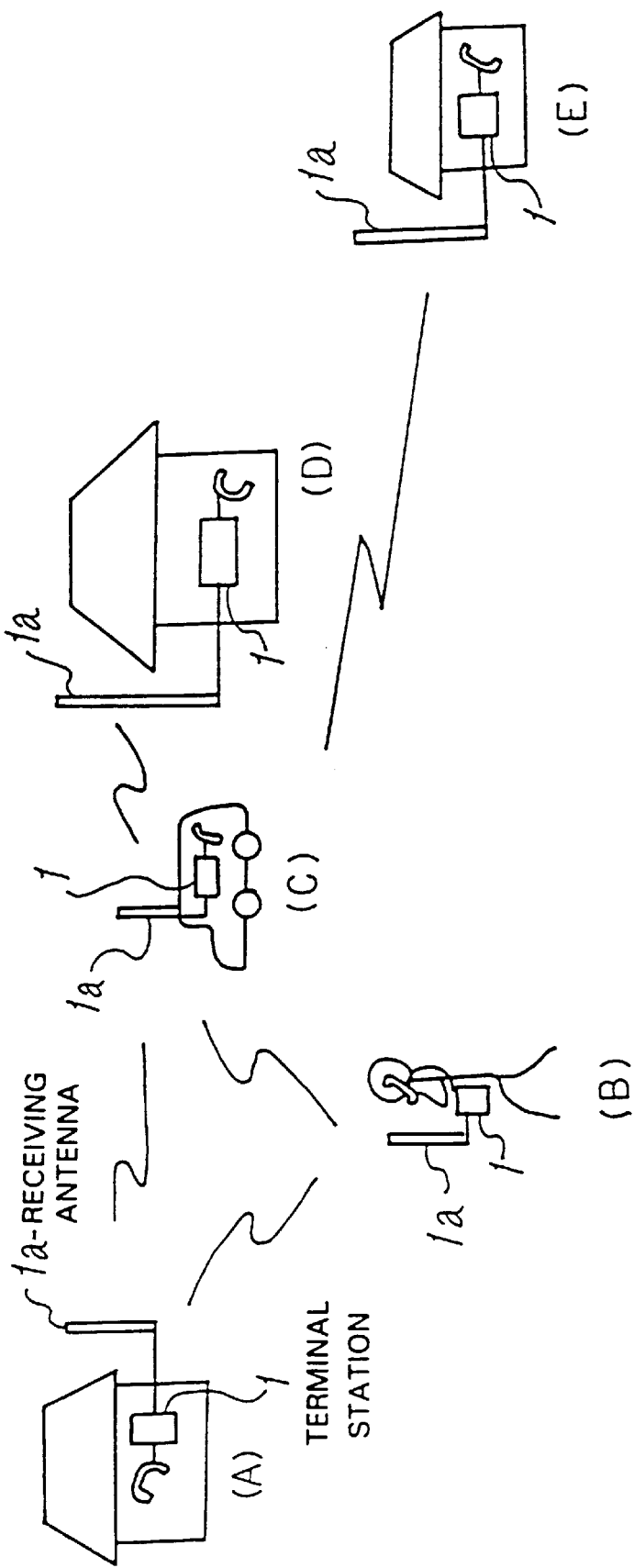
FIG. 4 is a block diagram which shows the entire construction of a personal communications system of the prior art.

In FIGS. 3 and 4, $g_0$ represents the total gain of the signal paths which is given by $g_0 = g_r \cdot g_m \cdot g_t$.

Figure 5:
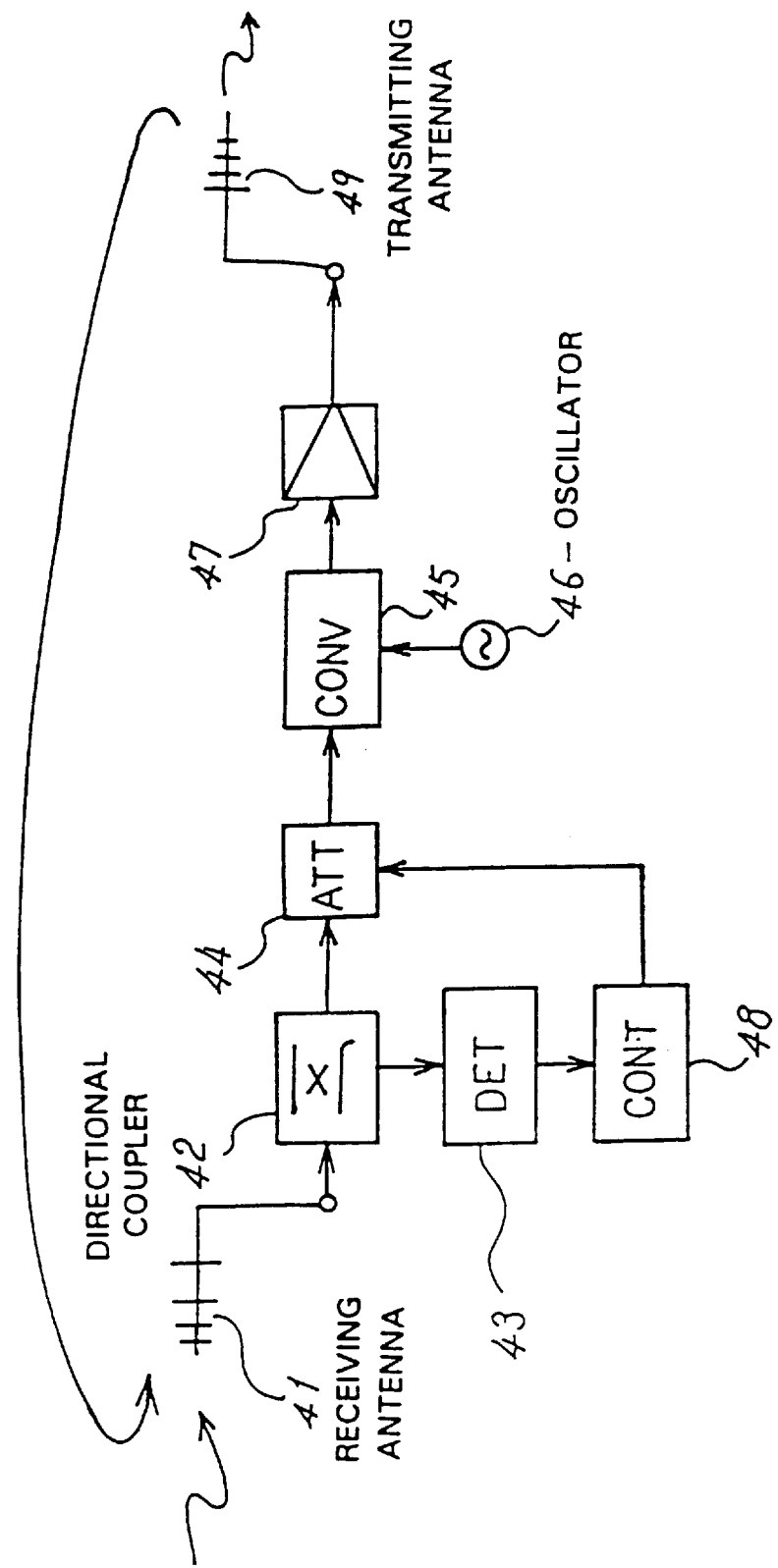
FIG. 5 is a block diagram which shows the construction of a conventional amplifying relay system wherein the transmitting and receiving frequencies are identical.

In cases where the interference-wave cancellation system of the present invention operates properly, FIG. 5 and consequently FIG. 6 are derived from FIGS. 3 and 4, and as a result the transmitted signal y(t) is expressed by Equation 7 which is the sum of the received signal x(t) amplified only by the gain go and the reference signal p(t).

$$cg_m-cg_0 L=0 \quad \text{Equation 5}$$

$$c=L(g_0/g_m)=g_r g_t L \quad \text{Equation 6}$$

$$y(t)=g_0 x(t)+g_t p(t) \quad \text{Equation 7}$$

Here, the problem is how the condition for cancellation of the interference wave which is expressed by Equation 5 is satisfied. Assuming Equation 5 substantially holds, the raw transmitted signal z(t) may be expressed by Equation 8 by introducing functions of time: $a=g_0/g_r$, $\epsilon(t) \approx \epsilon = g_0 L - g_m c$ $$z(t) \approx ax(t) + \epsilon \cdot p(t) \qquad \text{Equation 8}$$

In addition, the output of detection by the correlation detector 24 may be expressed by Equation 9. Here, since the received signal and reference signal are entirely separate signals and have different frequencies as shown in FIG. 3, averaging thereof over a prolonged period of time yields Equation 10. In Equations 9 and 10, the asterisk * indicates that the associated number is a complex conjugate number, and the overline indicates that the associated value is a time-averaged value.

$$<z(t), p(t)> = \overline{z(t) \cdot p^*(t)} \qquad \text{Equation 9}$$

$$\overline{x(t) \cdot p(t)^*} = 0 \qquad \text{Equation 10}$$

Accordingly, the output of detection of the correlation is expressed by Equation 11, and the correlation detection signal obtained in this manner undergoes integral control and is fed back to the coefficient c.

$$<z(t), p(t)> = \epsilon \cdot |P|^2 \qquad \text{Equation 11}$$

wherein $\overline{|p|^2}$ is average power of the reference signal.

In cases where the control is conducted according to the sampled-data control system, c(n) or the Nth c and $\epsilon(n)$ or the Nth $\epsilon$ are expressed by Equations 12 and 13, respectively. In Equation 12, K is the loop gain of the control loop.

$$c(n) = c(n-1) + K\epsilon(n) \qquad \text{Equation 12:}$$

$$\epsilon(n) = g_0 L - g_m c(n-1) \qquad \text{Equation 13}$$

Equations 12 and 13 are further used to derive equations 14 and 15.

$$c(n) = g_r g_r L \{1 + (1 - Kg_m)^n\} \qquad \text{Equation 14}$$

$$\epsilon(n) = -g_0 L (1 - Kg_m) n - 1 \qquad \text{Equation 15}$$

That is, in cases where the stability condition: $|1-Kg_m|<1$ is satisfied, $\epsilon(n) \to 0$ as the passage of time during which n approaches infinity, and consequently the error converges on 0. It is thus understood that the interference-wave cancellation system according to the present invention operates properly.

As mentioned above, since the base station may amplify and relay signals with a stable, high gain even in cases where the transmitting frequency and received frequency are identical, the terminal stations may use directional antennas even if they have the same level of function as conventional personal radio equipment, thus allowing widening of the coverage and establishment of communication paths between any desired terminal stations.

In addition, the base station employs the reference signal for cancellation of the interference wave, and the use of the frequency signal as the reference signal has an advantage of facilitating control of cancellation of the interference wave. On the other hand, in the case where the broadcast signal (local-area or wide-area broadcast signal) is used as the reference signal, although the control of cancellation of the interference wave becomes somewhat complicated as compared with the use of the frequency signal, it is an advantage that the terminal station can receive the broadcast information as long as the terminal station registers the given frequency channel on which the reference signal is sent.

Moreover, since the terminal stations communicate via the base station, it is possible to connect any of the terminal stations with an exterior public telephone network. The present invention, however, has been accomplished while focusing attention on the characteristics of personal radio equipment as cheap mass-volume products, with the aim of constructing a system which allows easy establishment of a network in an area without communications by their combination with a base station, and thus adopts a communications system which requires a switching operation by an operator. More specifically, when the operator receives a call through an exterior public telephone network which requests connection with a certain terminal station designated by its number, the operator calls the designated terminal station and establishes a connection with the control channel. A call to an exterior public telephone network is also performed with the help of the operator in the same manner as the aforementioned.

As mentioned above, each terminal station transmits and receives signals at an identical carrier frequency in the same manner as the conventional personal radio apparatuses, but is equipped with a directional antenna directed to the base station when it is installed indoors, or with a non-directional antenna in the same manner as according to the prior art or a directional antenna directed to the base station when it is installed in a mobile unit. On the other hand, the base station, being for all the terminal stations, is equipped with a non-directional transmitting antenna and receiving antenna which are located in such a positional relationship as to minimize the amounts of the signals coupled at the respective antennas, and is designed so that the received signal of the receiving antenna is amplified and fed to the transmitting antenna while undergoing cancellation of the leakage from the transmitting antenna.

With this design, the base station may relay signals at increased amplification factors without shifting the frequency from the normal frequency and without causing loop instability due to leakage of signals between the transmitting and receiving antennas. That is, the present invention has the effect of allowing easier establishment of a broader service area than according to the personal radio system of the prior art.

Here, since the reference signal employed by the base station is transmitted on a given channel, the terminal stations may receive the reference signal. Therefore, the frequency signal itself may be used as the reference signal; nevertheless, the base station is designed to be capable of utilizing a broadcast signal as the reference signal so that the signal is more valuable for the terminal stations. That is, the present invention also has the effect of allowing carrying of a broadcasting service, including radio broadcasts, etc. An additional effect of the present invention is in htat any terminal station and a public telephone network may be connected to each other via the base station. As mentioned above, the present invention has the effect of allowing provision of cost-effective radio communications systems to areas without communication networks.

What is claimed is:

1. A radio communication system, comprising: a plurality of terminal stations which transmit and receive signals at an identical frequency and a base station for establishing a communication path between terminal stations at an identical frequency band by operation of amplifying and relaying of signals, said terminal station including an antenna; and said base station including a transmitting antenna, a receiving antenna, and means for amplifying and feeding the received signal from said receiving antenna to said transmitting antenna while cancelling a leakage signal from said transmitting antenna which is contained in the received signal received by said receiving antenna, by using a control loop for cancellation of an interference signal in accordance with correlation between the received signal and a reference signal modulated by a received broadcast signal, said feeding means includes:

a circuit for generating a reference signal;

an interference-wave cancellation circuit which receives the received signal of the receiving antenna, said reference signal and a transmitted signal and outputs a compensated received signal after the leakage from the transmitting antenna has been canceled;

a signal combiner for combining the output of said interference-wave cancellation circuit and said reference signal to produce said transmitted signal; and a transmission amplifier for amplifying said transmitted signal and for outputting an amplified signal to said transmitting antenna.

2. A radio communication system as claimed in claim 1, wherein said terminal stations are personal radio equipment.

3. A radio communications system as claimed in claim 1, wherein the reference signal generating circuit generates a frequency signal of a given frequency channel as said reference signal.

4. A radio communications system as claimed in claim 1, wherein the reference signal generating circuit generates a frequency signal of a given frequency channel which has been modulated with a broadcast signal, as said reference signal.

5. A radio communications system as claimed in claim 4, wherein said broadcast signal is a local-area broadcast signal which is collected in a base-station installed area.

6. A radio communications system as claimed in claim 4, wherein said base station is equipped with a wide-area broadcast receiver and said broadcast signal is a wide-area broadcast signal received by said wide-area broadcast receiver.

7. A radio communications system as claimed in claim 1, wherein the interference-wave cancellation circuit includes:

a canceler for cancelling said leakage signal from said transmitting antenna which is contained in the received signal received by said receiving antenna, by using an interference-wave cancellation signal, a circuit for controlling the amplitude and phase of said transmitted signal on the basis of a control signal to output said interference-wave cancellation signal;

a correlation detector for detecting a correlation between the output of said canceler and said reference signal; and a circuit for generating said control signal on the basis of the output of said correlation detector.

8. A radio communications system as claimed in claim 1, wherein said base station includes:

a switch board to be connected to an exterior public telephone network;

a telephone signal modulator which modules a frequency signal of a given frequency channel with a telephone signal from the public telephone network which is outputted from said switch board, and sends the modulated signal to said feeding means; and a telephone signal demodulator which demodulates the received signal of a given frequency channel and outputs the demodulated signal as a telephone signal to said switch board.

9. A radio communication system comprising: a plurality of terminal stations which transmit and receive signals at an identical frequency and a base station for establishing a communication path between terminal stations at an identical frequency band by operation of amplifying and relaying of signals, said terminal station including an antenna; and said base station including a transmitting antenna, a receiving antenna, and an amplifying and feeding device to amplify and feed the received signal from said receiving antenna to said transmitting antenna while cancelling a leakage signal from said transmitting antenna which is contained in the received signal received by said receiving antenna, by using a control loop for cancellation of an interference signal in accordance with correlation between the received signal and a reference signal modulated by a received broadcast signal, said feeding device includes:

a circuit for generating a reference signal;

an interference-wave cancellation circuit which receives the received signal of the receiving antenna, said reference signal and a transmitted signal and outputs a compensated received signal after the leakage from the transmitting antenna has been canceled;

a signal combiner for combining the output of said interference-wave cancellation circuit and said reference signal to produce said transmitted signal; and a transmission amplifier for amplifying said transmitted signal and for outputting an amplified signal to said transmitting antenna.

* * * * *